United States Patent [19]

Christian et al.

[11] Patent Number: 5,176,834
[45] Date of Patent: Jan. 5, 1993

[54] ION EXPULSION ULTRAFILTRATION METHOD

[75] Inventors: Sherril D. Christian; Edwin E. Tucker; John F. Scamehorn, all of Norman, Okla.

[73] Assignee: Board of Regents of the University of Oklahoma, Norman, Okla.

[21] Appl. No.: 703,236

[22] Filed: May 20, 1991

Related U.S. Application Data

[63] Continuation-in-part of Ser. No. 391,146, Aug. 8, 1989, abandoned.

[51] Int. Cl.$^5$ .................................. B01D 61/16
[52] U.S. Cl. ........................ 210/639; 210/650; 210/651; 210/904; 210/906; 210/912; 210/913
[58] Field of Search .............. 210/638, 639, 650, 651, 210/904, 906, 912, 913

[56] References Cited

U.S. PATENT DOCUMENTS

| | | | |
|---|---|---|---|
| 4,089,778 | 5/1978 | Gauger | 210/23 F |
| 4,161,447 | 7/1979 | Kojima | 210/23 H |
| 4,741,831 | 5/1988 | Grinstead | 210/638 |
| 4,755,298 | 7/1988 | Grinstead | 210/638 |

FOREIGN PATENT DOCUMENTS

| | | | |
|---|---|---|---|
| 2458066 | 6/1975 | Fed. Rep. of Germany | 210/638 |
| 2505255 | 7/1976 | Fed. Rep. of Germany | 210/638 |

OTHER PUBLICATIONS

The Daily Oklahoman, "OU Chemists Test Their Idea of the Perfect Pollution Trap," Jan. 17, 1991, p. 15, col. 2 and p. 17, col. 2.
Christian et al., "Ion-Expulsion Ultrafiltration-A New Method for Purifying Aqueous Streams", Langmuir 5:876-879 (1989).
Sasaki et al., "Polyelectrolyte Ultrafiltration of Multivalent Ions Removal of Cu(II) by Sodium Poly(styrenesulfonate)", Langmuir 5.
Dunn et al., "Concentration Polarization Effects in the Use of Micellar-Enhanced Ultrafiltration to Remove Dissolved Organic . . . ".
Cox et al., "Donnan Dialysis Enrichment of Cations" Anal. Chem. 49(8):1272-1275 (1977).
Lonsdale et al., "Donnan-Membrane Effects in Hyperfiltration of Ternary Systems", JCS Far. Trans. I. 71:501 (1975).
Glueckauf et al., "The Donnan Law and Its Application to Ion Exchanger Polymers", Proc. Roy. Soc. 268A:3-39-349 (1962).
Blaedel et al., "Exchange Equilibrium Through Ion Exchange Membranes", Anal. Chem. 38:1305 (1966).
Higuchi et al., "Possible Utilization of Polyelectrolytes in Enhancing Drug Absorption", J. Am. Pharm. Assoc. 43:646 (1954).
Wheaton et al., Ind. Eng. Chem. 45:228 (1953).

Primary Examiner—Peter Hruskoci
Attorney, Agent, or Firm—Dunlap, Codding & Lee

[57] ABSTRACT

A method for reducing the concentration of target co-ions in a liquid feed mixture comprising target co-ions and counter-ions by adding a colloid such as a polyelectrolyte or surfactant comprising a colloidal ion and colloidal counter-ions to the feed mixture wherein the colloidal ion has the same type of charge as the target co-ion. The feed mixture containing the colloid is filtered through an ultrafiltration membrane having pores small enough to block the passage of the colloidal ion.

20 Claims, 1 Drawing Sheet

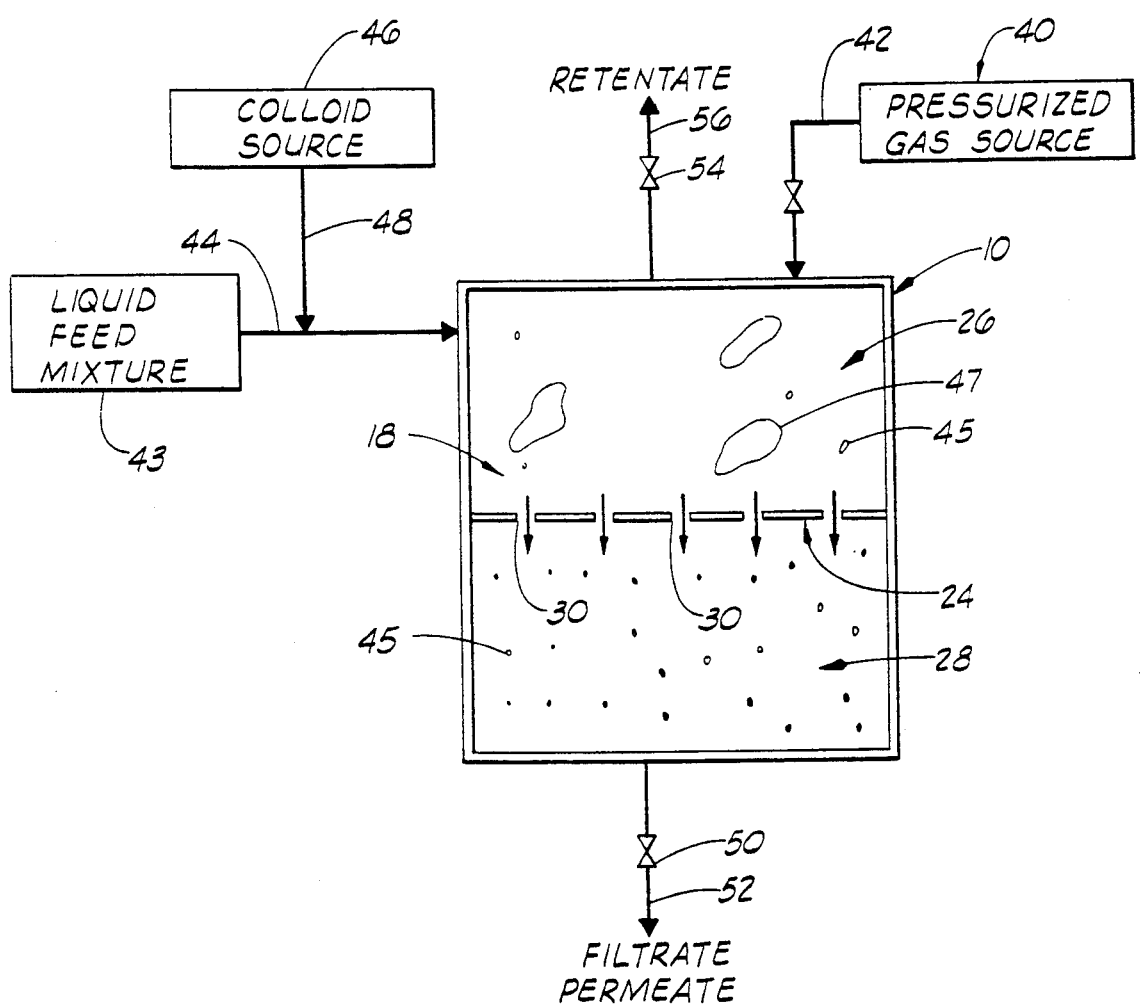

ION EXPULSION ULTRAFILTRATION METHOD

CROSS-REFERENCE TO RELATED APPLICATIONS

There is related subject matter to the present application in U.S. Ser. No. 114,445 filed Oct. 29, 1987 entitled "Micellar Enhanced Ultrafiltration Method for Reducing the Concentration of Multivalent Inorganic Ions in a Liquid Feed Mixture", abandoned and U.S. Ser. No. 250,439 filed Sep. 28, 1988 entitled "Polyelectrolyte Ultrafiltration Method for Reducing the Concentration of Multivalent Ions in a Liquid Feed Mixture" now abandoned. This is a continuation-in-part of U.S. Ser. No. 391,146, filed Aug. 8, 1989 entitled "Ion Expulsion Ultrafiltration Method" now abandoned.

FIELD OF THE INVENTION

The present invention relates generally to methods of filtration and, more specifically, to methods of reducing free ion concentration in a liquid feed mixture.

SUMMARY OF THE INVENTION

The present invention comprises reducing the concentration of target co-ions in a liquid feed mixture comprising target co-ions and counter-ions, comprising the steps of adding a colloid comprising at least one colloidal counter-ion (for example, a sodium or chlorine ion) and a colloidal ion to the feed mixture, wherein the colloid at least partially dissociates in the feed mixture, the colloidal ion being characterized by the same type of charge as the target co-ion and filtering a portion of the target co-ions through an ultrafiltration membrane having pores small enough to block a substantial portion of the colloidal ion.

The present invention further comprises a method for recovering a target co-ion from a liquid feed mixture comprising target co-ions and counter-ions, comprising the steps of adding a colloid comprising at least one colloidal counter-ion and a colloidal ion to the feed mixture, wherein the colloid at least partially dissociates in the feed mixture, the colloidal ion being characterized by the same type of charge as the target co-ion, and filtering a portion of the target co-ions and a portion of the feed mixture through an ultrafiltration membrane having pores small enough to block a substantial portion of the colloidal ion. The the portion of the target co-ions and the portion of the feed mixture passing through the pores of the membrane form a permeate solution from which the target co-ion is recovered.

BRIEF DESCRIPTION OF THE DRAWINGS

The single FIGURE in the drawings is a schematic view illustrating the method of the present invention for reducing the concentration of target co-ions in a liquid feed mixture.

DESCRIPTION OF THE PREFERRED EMBODIMENT

In many instances, a liquid feed mixture such as an aqueous stream or reservoir contains valuable or dangerous ionic species (hereinafter target ions). It is therefore desirable to remove such target ions from the feed mixture to decontaminate the feed mixture or to recover the valuable target ions therefrom. One of the principal problems encountered in the past in removing target ions from such liquid feed mixtures results from the very low concentrations of target ions in the feed mixtures typically ranging from about 0.01 (mg/L) or lower, to about 1000 (mg/L). While methods such as precipitation can be utilized for removal of target ions, the low concentrations have made such prior processes not economically feasible or, at least, extremely costly and therefore not cost effective. The present invention provides an economical and efficient method for removing low concentrations of target ions from liquid feed mixtures.

In general, the present invention contemplates a method for reducing the concentration of free target ions in a liquid feed mixture. The liquid feed mixture comprises target co-ions and counter-ions. The counter-ions of the feed mixture have a type of charge opposite to the target co-ions. For example, if the target co-ion is a cation then the counter-ion is an anion. The target co-ion and/or the counter-ions of the feed mixture may be monovalent or multivalent.

A colloid comprising a colloidal ion and at least one colloidal counter-ion (for example, a sodium or chlorine ion) is added to the feed mixture and at least partially dissociates therein. The colloid preferably has a molecular weight of about 10,000 to about 200,000 such as a micelle with a molecular weight of about 10,000 to about 200,000. The colloidal ion is highly charged on the surface thereof and is the same type of charge (negative or positive) as the target co-ion. "Highly charged" means more than one charge and preferably tens of charges and more preferably hundreds of charges. The colloid further comprises at least one colloidal counter-ion having a type of charge opposite to the colloidal ion.

It is not necessary that the counter-ion of the feed mixture and the colloidal counter-ion have the identical chemical composition or even have the same valence although rates and amounts of the expelled target co-ion may be affected by variations in the two counter-ions. It is only necessary that these counter-ions are both positive or negative and are opposite in charge to both the colloidal ion and the target co-ion.

When the colloid is dispersed in the feed mixture at least a portion of the colloid dissociates such that at least a portion of the colloidal counter-ion becomes a free counter-ion in the feed mixture, i.e., is not bound to the colloidal ion. However, it is believed that a substantial number of colloidal counter-ions remain bound to the colloidal ion. This dissociation creates an excess of free colloidal counter-ions to target co-ions in the feed mixture. It is believed that this excess of free colloidal counter-ions to target co-ions is necessary for or aids in the expulsion of the target co-ions from the feed mixture through the pores of the membrane.

As used herein the term "target co-ion" includes monovalent and multivalent ions such as metal or metal complex ions and polyatomic ions such as cyanide, chromate, phosphates and organic sulfonates.

Shown in the drawing is a cell 10 having walls which surround and encompass a fluid space 18. A membrane 24 is disposed in the fluid space 18 and extends across the cell 10, the membrane 24 dividing the fluid space 18 into an upper retentate portion 26 and a lower filtrate portion 28. The membrane 24 has a plurality of pores 30 formed therethrough (only some of the pores 30 being diagrammatically shown in the drawing and only some of the pores 30 being designated by a reference numeral). Each of the pores 30 in the membrane 24 is sized so that each of the pores 30 is small enough to block the passage of at least a substantial portion of the colloidal ion and large enough to allow the target ions to pass therethrough. The membrane 24 is of the type commonly utilized in ultrafiltration processes.

A pressurized gas source 40 is connected to the cell 10 by way of the conduit 42 so that the pressurized gas source 40 can pass pressurized gas into the cell 10 by way of the conduit 42. The pressurized gas is passed into the upper retentate portion 26 of the fluid space 18 formed in the cell 10.

A liquid feed mixture 43 comprising a liquid, target co-ions 45 (only two target co-ions 45 are labeled in the FIGURE) and counter-ions is connected to the cell 10 by way of a conduit 44. A supply of colloid 46 is connected to the conduit 44 by way of a conduit 48 for passing colloid 47 (only one colloid 47 being labeled in the FIGURE) into the liquid feed mixture 43 passing through the conduit 44.

The number, placement and size of the target co-ions and the colloid molecules shown in the FIGURE are for purposes of illustration only and are not to be construed as representing the actual number, size or placement of molecules in a particular fluid.

The pressurized gas source 40 cooperates to maintain the pressure cell 10 at a predetermined pressure level during the filtering operation. The pressurized gas source 40 preferably maintains the cell 10 or, more particularly, the fluid space 18 within the cell 10 at a predetermined pressure which is dependent, among other things, upon the characteristics of the particular membrane 24 being utilized in the cell 10. The optimum pressure for operation of the present invention is not necessarily the maximum pressure the membrane can take. Since the solute must diffuse to the membrane in high amounts in a short time to exit in the permeate, diffusional limitations may make a reduced pressure the optimum compromise between high concentrations in the permeate (low pressures) and high flux (high pressures).

In one example, a membrane commercially available from Spectrum and designated by the trade designation 76 mm diameter, 1K MWCO, Type C was utilized in the cell 10 and, for this particular membrane, the pressurized gas source 40 was adapted to maintain the pressure within the fluid space 18 at a constant 60 psig during the filtering operation. An effective pressure range for the filtering operation contemplated by the present invention is in a range from about 1 psig to about 75 psig or more than the osmotic pressure but less than a pressure which could damage the membrane. In some cases, depending upon the target co-ions 45 and colloid 47 utilized, lower pressures over the osmotic pressure of the liquid feed mixture 43, e.g., about 1 to about 10 psi, are sufficient to filter a substantial portion of the target co-ion 45 from the feed mixture 43 plus decrease the volume of feed mixture 43 passing through the pores of the filter 30. This can dramatically increase the concentration of the target co-ion 45 in the permeate solution which simplifies recovery of the target co-ion therefrom. This also simplifies disposal of the permeate solution if recovery is not sought.

After the cell 10 has been pressurized, the liquid feed mixture 43 is passed into the upper retentate portion 26 of the cell 10 by way of the conduit 44. Prior to the liquid feed mixture 43 being passed into the cell 10, colloid 47 is added to the feed mixture from the colloid source 46 by way of the conduit 48, the colloid 47 being mixed with the feed mixture 43 prior to the feed mixture entering the upper retentate portion 26 of the cell 10. In a commercial application, the feed mixture 43 may be supplied to a cell 10 by way of the conduit 44 and the colloid 47 may be added to the feed mixture 43 by injecting the colloid into the conduit 44, as illustrated in the drawing.

The colloid 47 may also be added to the liquid feed mixture 43 after the liquid feed mixture is added to the cell 10. In one other embodiment (not shown), the colloid may be added to the feed mixture in a tank prior to feeding or passing the feed mixture and colloid to the cell 10 by way of the conduit 44. The last-mentioned method of adding the colloid to the feed mixture contemplates a batch process wherein a predetermined supply of feed mixture is processed through the cell 10 in a batch form.

It also is contemplated that the present invention can be carried out in a continuous process and, in a continuous process, the colloid 47 preferably is added to the feed mixture 43 as the feed mixture flows through the conduit 44 by injecting the colloid into the conduit 44. Further, in a continuous process, the membrane 24 preferably is a plate and frame, hollow fiber or spiral wound membrane wherein the mixture of the feed mixture and colloid is passed into the appropriate flow channel and the filtrate continuously is passed through the membrane into the cell while the retentate is retained within the appropriate flow channels, the retentate ultimately being passed out of the cell. In this manner, the retentate continuously can be withdrawn from the cell since it is separated from the filtrate by the fiber membrane per se. One type of hollow fiber filter used in accordance with the present invention is Spectra/Por CA #132290 manufactured by Spectra. Other forms of commercially available ultrafiltration systems and membranes also can be utilized in a continuous or batch process for practicing the present invention.

During the filtering operation, a portion of liquid passes through the pores 30 of the membrane 24 and into the lower filtrate portion 28 of the cell 10. This liquid, called the filtrate or permeate contains a portion of liquid of the feed mixture and target co-ions 45 which were expelled from the retentate portion of the liquid feed mixture. A substantial amount of the colloidal ion 47 remains in the retentate. Preferably a substantial portion of the liquid feed mixture 43 remains as the retentate and only a small portion of the liquid feed mixture 43 passes through the pores 30 to form the permeate solution. As previously described, the target co-ion 45 is highly concentrated in the permeate as compared to the retentate and can easily be recovered therefrom if desired by standard separation processes such as electrowinning or hydrogen reduction or precipitation. A substantial amount of the colloidal ion remains in the retentate and may be reused with subsequent contaminated liquid feed mixtures.

This filtering process is carried out for a period of time, or having a specified residence time in a continuous process until a point in time before the feed mixture and colloidal ion mixture in the upper retentate portion 26 of the cell 10 reach a gel point or, in other words, a point in time before the mixture of liquid feed mixture and colloidal ion in the upper retentate portion 26 becomes so viscous that the liquid will not flow through the membrane 24. At or before this point in time, the filtering process is terminated by interrupting the pressurized gas flowing into the fluid space 18 from the pressurized gas source 40.

After the filtering process has been terminated, the permeate solution may be withdrawn from the lower permeate portion 28 of the cell 10 by any appropriate method, preferably by opening valve 50 in a conduit 52. The retentate in the upper retentate portion 26 of the cell 10 is withdrawn from the cell 10 by opening a valve 54 in a conduit 56 which is connected and into fluidic communication with the upper retentate portion 26 of the cell 10. After the permeate and retentate have been withdrawn from the cell 10, the process then may be repeated to process additional amounts of liquid feed mixture 43.

The process just described represents a batch type filtering operation. However, the process also can be carried out as a continuous process utilizing a hollow fiber or spiral wound type of membrane or other commercially available membrane suitable for ultrafiltration, as mentioned before.

The colloid of the present invention has a molecular weight compatible with the filtration system utilized. For example, if the molecular weight of the colloid is too high, the colloid in solution will be too viscous for effective filtration of the feed mixture to occur. In general, molecular weights of colloids ranging from about 10,000 to about 200,000 have been found to be effective.

Some colloids utilized in accordance with the present invention are surfactants such as hexadecylpyridinium chloride (or cetylpyridinium chloride) and sodium dodecylsulfate, and polyelectrolytes such as poly(sodium 4-styrenesulfonate) and Gantrez ®, a copolymer of maleic anhydride and vinylmethyl ether obtained from GAF Corporation. The concentration of the surfactants is generally at least the critical micelle concentration up to a concentration before the solution becomes too viscous to effectively filter the feed mixture. The polyelectrolyte can generally operate at lower concentrations than the surfactants with an upper concentration limit of the polyelectrolyte at that concentration before effective filtration is effected, e.g., the solution becomes too viscous.

In general, the more concentrated the total amount of polyelectrolyte and surfactant in the feed mixture, the higher the percentage of co-ions expelled from the liquid retentate mixture. It is believed that a practical high concentration of total polyelectrolyte in the retentate is about 0.4 Molar, preferably 0.3 Molar or in a range from about $1.0 \times 10^{-4}$ Molar to about 0.4 Molar or much less with the preferred range being from bout $2.0 \times 10^{-4}$ to about 0.3 Molar or much less. (Polyelectrolyte concentrations are given on the basis of moles of charge, not molecular weight. For example, 0.2M polystyrene sulfonate refers to 0.2 moles of styrene sulfonate monomer units per liter.) One advantage of using polyelectrolyte is that very low concentrations of polyelectrolyte may be effective in application. It is believed that a practical high concentration of total surfactant in the retentate is about 0.4 Molar, preferably 0.3 Molar or in a range from about $1.0 \times 10^{-4}$ Molar to about 0.4 Molar with the preferred range being from about $2.0 \times 10^{-4}$ to about 0.3 Molar.

The present invention can be applied to expel target ions of a particular charge (+ or −) by using a colloidal species having the same charge. Below are lists of a few of the many possible colloids which may be used with this invention, and some target ions of the same charge. In the first list below, any positive colloid (C+) could be used to remove (by ion expulsion) any of the target cations (M+) with particular effectiveness. In the second list below any negative colloid (C−) could be used to remove (by ion expulsion) any of the target anions (A−).

| C+ (positively charged colloid) | M+ (positively charged target co-ion, or cation) |
| --- | --- |
| poly(dimethyldiallyl ammonium chloride) | $Na^+$, $K^+$, $Ca^{2+}$, $Mg^{2+}$ |
| poly(allylamine) | $Cu^{2+}$, $Zn^{2+}$, $Hg^{2+}$ |
| poly(ethyleneimine) | $Cd^{2+}$, $Pb^{2+}$ |
| | $Cr^{3+}$, $CrOH^{2+}$ |
| poly(vinylpyridinium chloride) | pyridinium, quaternary ammonium cations |
| hexadecylpyridinium chloride | |
| hexadecyltrimethylammonium chloride | |

Similarly, lists of negative colloids (C−) and anions (A−) may include:

| C− (negatively charged colloid) | A− (negatively charged target co-ion, or anion) |
| --- | --- |
| Gantrez (S-95) copolymer of vinylmethylether and maleic anhydride (from GAF) | $CN^-$, $Cl^-$, $Br^-$, $I^-$ |
| sodium (polystyrenesulfonate) | $CrO_4^{2-}$, $SO_4^{2-}$, $TeO_4^{2-}$ |
| sodium dodecylsulfate, sodium alkylbenzenesulfonate, sodium laurate and other carboxylates, sodium oleate. | $AsO_4^{3-}$, $PO_4^{3-}$, $HPO_4^{2-}$, $CdCl_4^{2-}$ |
| dodecyldimethylamine oxide | $Fe(CN)_6^{3-}$, $Fe(CN)_6^{4-}$ |
| | $Ni(CN)_4^{2-}$, $C_2O_4^{2-}$ |
| | $AuCl_4^-$, $AuBr_4^-$ |
| | benzoate, naphthoate, arylsulfonate anions |

The following examples illustrate the method of the present invention.

EXAMPLE 1

A hollow-fiber ultrafiltration apparatus was utilized in which a feed mixture stream is forced through a bundle of regenerated cellulose fibers, having a molecular weight cut-off of approximately 6000 daltons. A gauge pressure of approximately ⅔ atm was applied to the feed entering the ultrafiltration apparatus, and the volumetric flow rate of the retentate solution (that part of the solution that does not exit through the pores) was controlled by constriction the outlet tube. The permeate:retentate ratios varied from approximately 1:4 to 1:30, with a feed containing $1.0 \times 10^{-4}$M $CuCl_2$ and 0.1M cetyl pyridinium chloride. Table I indicates the concentrations of copper in the retentate and the permeate at various permeate to retentate volume ratios.

TABLE I

| permeate/retentate volume ratio | $[Cu^{2+}]$ in permeate (mM) | $[Cu^{2+}]$ in retentate (mM) |
| --- | --- | --- |
| 1:30 | 0.90 | 0.068 |
| 1:20 | 0.78 | 0.049 |
| 1:9 | 0.56 | 0.028 |
| 1:8 | 0.62 | 0.036 |
| 1:4 | 0.44 | 0.021 |

EXAMPLE 2

Ultrafiltration results for initial retentate solution consisting of 300 mL of 0.100M hexadecylpyridinium chloride and $1.0 \times 10^{-4}$M $CuCl_2$ at 30° C. Data were obtained with 400-mL Nuclepore batch stirred cells, with 76-mm-diameter, 5000-dalton molecular weight cutoff anisotropic cellulose acetate membranes, at an applied pressure of approximately 0.5 atm.

TABLE 2

| ID | [Cu]per mM | [Cu]ret mM | running mass g | total mass g | mmoles | running total mmoles | [Cu]ret remaining μM | Ratio per/ret |
|---|---|---|---|---|---|---|---|---|
| 1 | 0.1147 | | 5.0136 | 5.0136 | 0.0005751 | 0.000575 | 98.4 | 1.17 |
| 2 | 0.1151 | | 5.2823 | 10.2959 | 0.0006080 | 0.001183 | 98.1 | 1.17 |
| 3 | 0.1220 | | 9.7045 | 20.0004 | 0.0011839 | 0.002367 | 97.3 | 1.25 |
| 4 | 0.1275 | | 9.6316 | 29.6320 | 0.0012280 | 0.003595 | 96.2 | 1.33 |
| 5 | 0.1351 | | 9.5960 | 39.2280 | 0.0012964 | 0.004891 | 94.8 | 1.43 |
| 6 | 0.1401 | | 9.5767 | 48.8047 | 0.0013417 | 0.006233 | 93.0 | 1.51 |
| 7 | 0.1528 | | 23.4618 | 72.2665 | 0.0035850 | 0.009818 | 86.9 | 1.76 |
| 8 | 0.1729 | | 23.7343 | 96.0008 | 0.0041037 | 0.013922 | 76.9 | 2.25 |
| 9 | 0.1815 | | 23.7721 | 119.7729 | 0.0043146 | 0.018236 | 63.1 | 2.88 |
| 10 | 0.1849 | | 24.3263 | 144.0992 | 0.0044979 | 0.022734 | 44.0 | 4.20 |
| 11 | 0.1662 | | 23.6927 | 167.7919 | 0.0039377 | 0.026672 | 22.1 | 7.51 |
| 12 | | 0.0247 | | | | | | |

EXAMPLE 3

Table 3 shows the ultrafiltration results for initial retentate solution consisting of 300 mL of 0.050M Gantrez S-95 (monomer molarity) at pH 8.5 and $1.0 \times 10^{-4}$M sodium chromate at 30° C. Data were obtained with 400-mL Spectrum batch stirred cells, with 76-diameter, 5000-dalton molecular weight cutoff anisotropic cellulose acetate membranes, at an applied pressure of approximately 1.7 atm.

TABLE 3

| ID | [CrO4]per mM | [CrO4]ret mM | running mass g | total mass g | mmoles | running total mmoles | [CrO4]ret remaining μM | Ratio per/ret |
|---|---|---|---|---|---|---|---|---|
| 1 | 0.1510 | | 5.8068 | 5.8068 | 0.0008768 | 0.000877 | 95.0 | 1.59 |
| 2 | 0.1970 | | 5.8420 | 11.6488 | 0.0011509 | 0.002028 | 93.0 | 2.12 |
| 3 | 0.2029 | | 5.7384 | 17.3872 | 0.0011643 | 0.003192 | 90.7 | 2.24 |
| 4 | 0.2035 | | 11.2258 | 28.6130 | 0.0022845 | 0.005476 | 86.1 | 2.36 |
| 5 | 0.1990 | | 27.0520 | 55.6650 | 0.0053833 | 0.010860 | 73.5 | 2.71 |
| 6 | 0.1879 | | 23.6143 | 79.2793 | 0.0044371 | 0.015297 | 61.3 | 3.06 |
| 7 | 0.1716 | | 23.8391 | 103.1184 | 0.0040908 | 0.019388 | 48.0 | 3.58 |
| 8 | 0.1495 | | 22.7409 | 125.8593 | 0.0033998 | 0.022788 | 34.7 | 4.31 |
| 9 | 0.1212 | | 22.3845 | 148.2438 | 0.0027130 | 0.025501 | 21.9 | 5.52 |
| 10 | 0.0896 | | 19.0751 | 167.3189 | 0.0017091 | 0.027210 | 12.2 | 7.34 |
| 11 | 0.0560 | | 21.5472 | 188.8661 | 0.0012066 | 0.028416 | 3.72 | 15.04 |
| 12 | | 0.0067 | 111.1339 | | | | | |

Changes may be made in the embodiments of the invention described herein, the steps or sequence of steps of the methods described herein without departing from the spirit and the scope of the invention as defined in the following claims.

What is claimed is:

1. A method for reducing the concentration of target co-ions in a retentate of a liquid feed mixture comprising dissociated target co-ions and counter-ions, wherein the target co-ions and the counter-ions are oppositely charged, comprising:

adding to the feed mixture a sufficient amount of a colloid having a molecular weight greater than 10,000 comprising at least one colloidal counter-ion and a highly charged colloidal ion, wherein the colloid at least partially dissociates in the feed mixture to create an excess of free colloidal counter-ion to target co-ions, the colloidal ion being characterized by the same type of charge as the target co-ion and the colloidal counter-ion having the same type of charge as the counter-ion, and wherein the target co-ion is sized to pass through the pores of an ultrafiltration membrane and the colloidal ion is sized such that the colloidal ion cannot pass through the pores of the ultrafiltration membrane; and filtering at least a portion of the target co-ions through the ultrafiltration membrane.

2. The method of claim 1 wherein the step of filtering the feed mixture is defined further as filtering the feed mixture through the membrane under a pressure of at least about 1 psig.

3. The method of claim 1 wherein the pressure is defined further as being in a range from about 1 psig to about 75 psig.

4. The method of claim 1 wherein the pressure is defined further as being in a range from about 10 psig to about 75 psig.

5. The method of claim 1 wherein the colloid comprises a surfactant of sufficient concentration to form a micelle.

6. The method of claim 5 wherein the step of adding the colloid to the feed mixture comprises adding the surfactant in amounts sufficient so the resulting mixture has a surfactant concentration in a range from about $1.0 \times 10^{-4}$ to about 0.4 Molar.

7. The method of claim 5 wherein the step of adding the colloid to the feed mixture comprises adding the surfactant in amounts sufficient so the resulting mixture has a surfactant concentration in a range from about $2.0 \times 10^{-4}$ to about 0.3 Molar.

8. The method of claim 1 wherein the colloid comprises a polyelectrolyte.

9. The method of claim 8 wherein the step of adding the colloid to the feed mixture is defined further as adding the polyelectrolyte in amounts sufficient so the resulting mixture has a polyelectrolyte concentration in a range from about $1.0 \times 10^{-4}$ Molar to greater amounts of the polyelectrolyte.

10. The method of claim 8 wherein the step of adding the colloid to the feed mixture is defined further as adding the polyelectrolyte in amounts sufficient so the resulting mixture has a polyelectrolyte concentration in a range from about $2.0 \times 10^{-4}$ Molar to greater amounts of polyelectrolyte.

11. A method for recovering a target co-ion from a liquid feed mixture comprising dissociated target co-ions and counter-ions, wherein the target co-ions and the counter-ions are oppositely charged, comprising:

adding to the feed mixture a sufficient amount of a colloid having a molecular weight greater than 10,000 comprising a highly charged colloidal ion and a colloidal counter-ion, wherein the colloid at least partially dissociates in the feed mixture to create an excess of free colloidal counter-ion to target co-ions, the colloidal ion being characterized as having the same type of charge as the target co-ion and the colloidal counter-ion having the same type of charge as the counter-ion; and filtering at least a portion of the target co-ions and a portion of the feed mixture through an ultrafiltration membrane having pores, wherein the portion of the target co-ion and the portion of the feed mixture passing through the pores of the membrane forms a permeate solution, and wherein the target co-ion is sized to pass through the pores of the ultrafiltration membrane and the colloidal ion is sized such that the colloidal ion cannot pass through the pores of the ultrafiltration membrane; and recovering the target co-ion from the permeate solution.

12. The method of claim 11 wherein the step of filtering the feed mixture is defined further as filtering the feed mixture through the membrane under a pressure of at least about 1 psig.

13. The method of claim 11 wherein the pressure is defined further as being in a range from about 1 psig to about 75 psig.

14. The method of claim 11 wherein the pressure is defined further as being in a range from about 10 psig to about 75 psig.

15. The method of claim 11 wherein the colloid comprises a surfactant of at least critical micelle concentration.

16. The method of claim 15 wherein the step of adding the colloid to the feed mixture comprises adding surfactant in amounts sufficient so the resulting mixture has a surfactant concentration in a range from about $1.0 \times 10^{-4}$ to about 0.4 Molar.

17. The method of claim 15 wherein the step of adding the colloid to the feed mixture comprises adding surfactant to the feed mixture in amounts sufficient so the resulting mixture has a surfactant concentration in a range from about $2.0 \times 10^{-4}$ to about 0.3 Molar.

18. The method of claim 11 wherein the colloid comprises a polyelectrolyte.

19. The method of claim 18 wherein the step of adding the colloid to the feed mixture is defined further as adding the polyelectrolyte to the feed mixture in amount sufficient so the resulting mixture has a polyelectrolyte concentration in a range from about $1.0 \times 10^{-4}$ Molar to greater amounts of the colloid.

20. The method of claim 18 wherein the step of adding the colloid to the feed mixture is defined further as adding the polyelectrolyte to the feed mixture in amounts sufficient so the resulting mixture has apoolyelectrolyte concentration in a range from about $2.0 \times 10^{-4}$ Molar to greater amounts of the colloid.

* * * * *

UNITED STATES PATENT AND TRADEMARK OFFICE
CERTIFICATE OF CORRECTION

PATENT NO. : 5,176,834
DATED : January 5, 1993
INVENTOR(S) : Christian et al.

It is certified that error appears in the above-identified patent and that said Letters Patent is hereby corrected as shown below:

Column 10, line 25, the word "amount" should be --amounts--.

Column 10, line 31 and 32, delete the word "apoolyelectrolyte" and insert -- a polyelectrolyte--.

Signed and Sealed this

Ninth Day of November, 1993

Attest:

BRUCE LEHMAN

*Attesting Officer*   *Commissioner of Patents and Trademarks*